United States Patent
Kaseridis et al.

(10) Patent No.: US 12,360,903 B2
(45) Date of Patent: Jul. 15, 2025

(54) CACHE COHERENCE USING DYNAMIC COARSE-GRAINED TRACKING

(71) Applicant: Microsoft Technology Licensing, LLC, Redmond, WA (US)

(72) Inventors: Dimitrios Kaseridis, Austin, TX (US); Mukund Ramakrishna, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,147

(22) Filed: May 31, 2023

(65) Prior Publication Data

US 2024/0403219 A1    Dec. 5, 2024

(51) Int. Cl.
*G06F 12/0831* (2016.01)
*G06F 12/0817* (2016.01)

(52) U.S. Cl.
CPC ...... *G06F 12/0828* (2013.01); *G06F 12/0831* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 6,631,447 B1 | 10/2003 | Morioka | |
| 9,223,711 B2 | 12/2015 | Philip | |
| 10,592,424 B2 | 3/2020 | Beard | |
| 10,657,055 B1 | 5/2020 | Jalal | |
| 11,550,720 B2 | 1/2023 | Ramagiri | |
| 2002/0124144 A1 | 9/2002 | Gharachorloo | |
| 2008/0147988 A1 | 6/2008 | Heller et al. | |
| 2008/0209133 A1 | 8/2008 | Ozer | |
| 2014/0052905 A1 | 2/2014 | Lih | |
| 2015/0012719 A1 | 1/2015 | Tune | |
| 2016/0062890 A1 | 3/2016 | Salisbury | |
| 2016/0062893 A1 | 3/2016 | Tune | |
| 2016/0117249 A1 | 4/2016 | Lin | |
| 2017/0255557 A1* | 9/2017 | Robinson | ............ G06F 12/0815 |
| 2017/0286299 A1 | 10/2017 | Sury | |

(Continued)

FOREIGN PATENT DOCUMENTS

WO    2017155659 A1    9/2017

OTHER PUBLICATIONS

Moshovos et al. "JETTY: Filtering Snoops for Reduced Energy Consumption in SMP Servers." Jan. 2001. IEEE. HPCA 2001. pp. 85-96.*

(Continued)

*Primary Examiner* — Nathan Sadler
(74) *Attorney, Agent, or Firm* — Holzer Patel Drennan

(57) ABSTRACT

The described technology provides a method including receiving a request for allocating an incoming cacheline to one of a plurality of SFT entries in a snoop filter (SFT), performing a tag lookup function for a tag of the incoming cacheline in the SFT, in response to determining that the incoming cacheline is not part of an existing sector of any of the plurality of SFT entries, finding one or more candidate SFT entries, wherein the candidate SFT entries can be converted to an aggregated entry, selecting one of the candidate SFT entries, and allocating the incoming cacheline to the selected SFT entry.

17 Claims, 10 Drawing Sheets

(56) References Cited

U.S. PATENT DOCUMENTS

| | | | |
|---|---|---|---|
| 2019/0073304 A1 | 3/2019 | Jiang | |
| 2020/0042446 A1* | 2/2020 | Mittal | G06F 12/0833 |
| 2020/0218657 A1 | 7/2020 | Forrest | |
| 2020/0250098 A1* | 8/2020 | Ma | G06F 12/0846 |
| 2021/0294743 A1* | 9/2021 | Randall | G06F 12/1441 |
| 2022/0100672 A1 | 3/2022 | Apte | |
| 2022/0164288 A1 | 5/2022 | Ramagiri | |
| 2022/0308999 A1 | 9/2022 | Randall | |
| 2023/0100746 A1* | 3/2023 | Loison | G06F 12/0833 |
| | | | 711/141 |
| 2023/0139212 A1 | 5/2023 | Randall | |
| 2024/0403218 A1 | 12/2024 | Robinson | |
| 2024/0419593 A1 | 12/2024 | Ramakrishna | |
| 2024/0419594 A1 | 12/2024 | Panavich | |
| 2024/0427703 A1 | 12/2024 | Robinson | |

OTHER PUBLICATIONS

Andreas Moshovos. "RegionScout: Exploiting Coarse Grain Sharing in Snoop-Based Coherence." Jun. 2005. IEEE. ISCA 2005.*

Zebchuk et al. "Multi-Grain Coherence Directories." Dec. 2013. ACM. MICRO'46. pp. 359-370.*

Ehsan Atoofian. "Adaptive Snoop Granularity and Transactional Snoop Filtering in Hardware Transactional Memory." Jul. 2014. IEEE. Canadian Journal of Electrical and Computer Engineering. vol. 37. pp. 76-85.*

International Search Report and Written Opinion received for PCT Application No. PCT/US2024/029558, Aug. 30, 2024, 15 pages.

International Search Report and Written Opinion received for PCT Application No. PCT/US2024/030161, Jul. 24, 2024, 12 pages.

Non-Final Office Action mailed on Jun. 10, 2024, in U.S. Appl. No. 18/325,863, 13 pages.

Notice of Allowance mailed on Aug. 27, 2024, in U.S. Appl. No. 18/340,359, 08 pages.

International Search Report and Written Opinion received for PCT Application No. PCT/US2024/033323, Oct. 11, 2024, 11 pages.

International Search Report and Written Opinion received for PCT Application No. PCT/US2024/033480, Sep. 10, 2024, 15 pages.

International Search Report and Written Opinion received for PCT Application No. PCT/US2024/034880, Oct. 14, 2024, 14 pages.

Non Final Office Action mailed on Sep. 26, 2024, in U.S. Appl. No. 18/336,637, 09 pages.

Final Office Action mailed on Dec. 11, 2024, in U.S. Appl. No. 18/325,863, 13 pages.

Notice of Allowance mailed on Feb. 14, 2025, in U.S. Appl. No. 18/336,637 10 pages.

Non-Final Office Action mailed on Feb. 13, 2025, in U.S. Appl. No. 18/336,694, 27 pages.

Notice of Allowance mailed on Feb. 13, 2025, in U.S. Appl. No. 18/340,359, 05 pages.

Notice of Allowance mailed on Apr. 28, 2025, in U.S. Appl. No. 18/325,863, 8 pages.

* cited by examiner

CACHE COHERENCE USING DYNAMIC COARSE-GRAINED TRACKING

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including receiving a request for allocating an incoming cacheline to one of a plurality of SFT entries in a snoop filter (SFT), performing a tag lookup function for a tag of the incoming cacheline in the SFT, in response to determining that the incoming cacheline is not part of an existing sector of any of the plurality of SFT entries, finding one or more candidate SFT entries, wherein the candidate SFT entries can be converted to an aggregated entry, selecting one of the candidate SFT entries, and allocating the incoming cacheline to the selected SFT entry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 1 illustrates an example implementation of a system providing cache coherence using snoop filters.

FIG. 2 discloses example operations of the cache coherence system disclosed herein providing dynamic coarse-grained tracking.

FIG. 3 discloses alternative example operations of the cache coherence system disclosed herein providing dynamic coarse-grained tracking.

DETAILED DESCRIPTIONS

Figure 1:
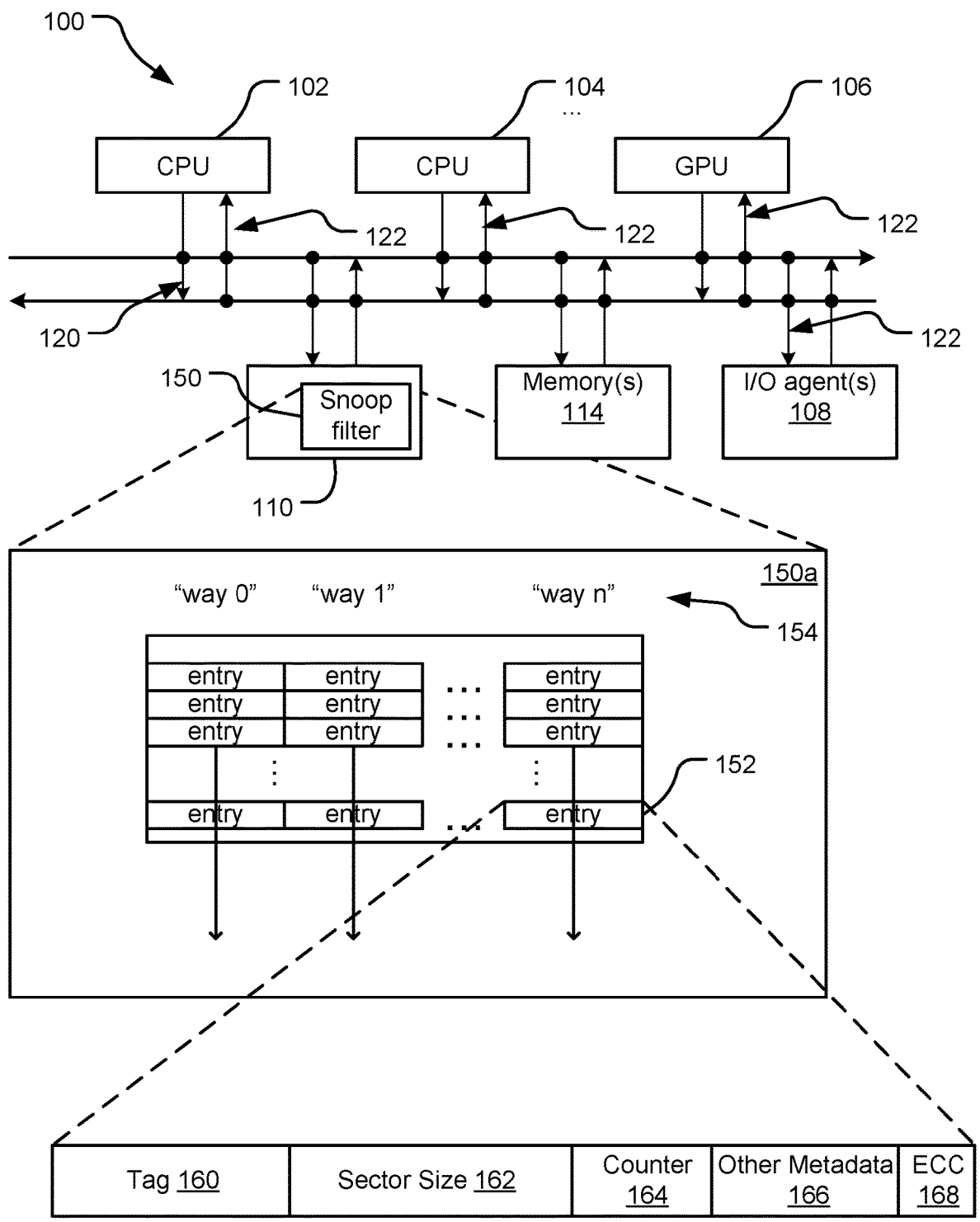

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, typically other cached copies may be first written back to system memory or, in case of the cache copies are unmodified, they may be invalidated. The memory block for which HW-enforced cache coherency is maintained is called a coherence granule (cogran) and system may match its cogran size to the cache line size.

Cache coherency is a fundamental property of multi-core architectures which requires concurrently executing threads to be presented with a consistent and coherent view of the memory address space. Modern multi-core architectures dedicate significant amounts of hardware and design resources in ensuring that the chip has coherent domains where dedicated pipelines and flows work in the background to ensure coherency. From a performance perspective, these activities should have a minimal impact on regular execution of the performance. As designs scale to an ever-increasing number of cores, the overhead of maintaining coherence has grown significantly as well.

One of the architectural features that helps solve the problem of scale is a snoop filter (SFT). This dedicated hardware structure provides an up to date view of the cachelines resident in private caches on agents like CPUs so that coherency operations are carried out as necessary, thereby reducing the pressure on the system of chip (SoC) resources-specifically on-chip bandwidth and cache pipeline bandwidth, which otherwise may be used to send and process snoop requests.

To be effective, an SFT maybe required to precisely track the upstream cache contents. This, in turn, requires sufficient provisioning in terms of the area reserved for the SFT as any entry that cannot be tracked by the snoop filter has to be invalidated from the private cache as well which can be detrimental to performance. In an ideal world, the snoop filter needs to provide at least 1× coverage of the size of the private cache. In area terms, as the SFT only holds tags, it needs to have an entry for each valid cacheline in the private cache. Therefore, number of SFT entries (N) for 1× coverage=L2 size (B)/L2 line size (B), and area of SFT=area per SFT entry×N.

Therefore, for an L2 cache of 256 Kbytes with L2 cacheline size is 64 bytes would require 4K SFT entries for just one agent CPU. This SFT area requirement is further exacerbated by set associative nature of private caches and by the large number of agents on SoCs. One method implemented to solve this area constraint is coarse-grained tracking of cache lines in the SFT. In effect, if the SFT tracks n cachelines per entry then the area requirement for the same amount of coverage is now 1/n. This approach may require the workload to access all n cachelines of the same sector close together in time. In some implementations, the n cachelines that are clubbed into the same entry are spatially co-located as well. However, in such implementations, if the locality rules are not adhered to by a particular workload, then the sectoring approach comes with a significant performance penalty of over-snooping. To mitigate the oversnooping, implementations of SFT may include metadata to each coarse entry.

Implementations of the cache coherence system disclosed herein provide an SFT tracking mechanism that dynamically adapts its tracking granularity to the access footprint of the workload mix for a given system on chip (SoC). Specifically, the SFT disclosed herein dynamically aggregates existing fine-grained or baseline SFT entries in an SFT and merges them. This allows freeing up space for sparse entries, thus achieving the benefit of area savings provided by coarse-grained tracking but only up to the extent that the workload doesn't suffer negative side-effects. Specifically, the implementations disclosed herein enhances the SFT entries in the SFT with metadata including a size field indicating the size of a sector being tracked by the SFT entry. Also, the SFT metadata includes a counter or a bit vector that tracks the number of cachelines allocated to an SFT entry.

Here a sector may be composed of n consecutive cachelines where the base address of the sector for any size T has bits [log 2(T): 0]=0 and where n=T/size of (cacheline), here the size of (cacheline) gives the size of the baseline cogran. Furthermore, all cachelines reside in the same set of the same slice of a multi-instance SFT. In the illustrated implementations, the size of the sector is restricted to power of 2 sizes in bytes.

The cache coherence system disclosed herein illustrates two methods of performing the aggregation of fine-grained entries. The first method, further discussed with respect to FIG. 2 below uses an opportunity-based expander that proactively seeks to create sectors of all cachelines. The second method, further discussed with respect to FIG. 3 below allows normal SFT operation until the point that SFT evictions are required. Each of these methods include an enhanced tag lookup phase during which tag comparison accounts for a sector size stored in the metadata of SFT entries.

Subsequent TAG update phase determines if an incoming transaction requires allocation of an SFT entry. If allocation is required, the incoming cacheline may be part of an existing sector, an existing sector may grow to incorporate the new SFT entry, or a new SFT entry may need to be allocated. If the incoming transaction does not require an SFT entry allocation, the incoming transaction may be eviction from an agent's private cache. In this case, a counter field of the metadata of an SFT entry may be updated and once the counter reaches zero, the SFT entry may be de-allocated.

FIG. 1 illustrates an implementation of a system 100 providing cache coherence using snoop filters in accordance with the technology disclosed herein. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (POS) 110, and a memory 114. Although the present example shows two CPU cores and one GPU, it is understood that any number of CPU cores and CPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent and shared memory blocks (cograns) in their internal caches, a snoop filter (SFT) 150 may keep track of a record and location of these cograns. Any of the agents 102-108 may issue coherent or non-coherent requests and the POS 110 ensures the serialization of the memory access requests using the snoop filter 150 to provide memory coherency.

For example, the POS 110 receives a coherent request 120 from a CPU 102. In response to the coherent request 120, the POS 110 issues a snoop command 122 to the CPU cores 104, the GPU 106, and the I/O agents 108. The CPU cores 104, the GPU 106, and the I/O agents 108 may provide the requested coherent information back to the POS 110. When sending the snoop 122, the POS 110 refers to the SFT 150.

An example implementation of the SFT 150 is illustrated by SFT 150a. The SFT 150a includes a data structure to track the location of cograns that are currently cached in by agents 102-108. The SFT 150a may be an n-way filter as indicated by n-arrays 154. The snoop filter 150a may include an array of entries 152, the content of the entries 152 is further described below. In an implementation of the SFT 150a disclosed herein, a logical entry 152 may be configured to store a tag 160, sector size 162, counter 164, other metadata 166, and an error correction code (ECC) 168. The structure of various fields 160-168 of the snoop filter entry 152 are illustrated in further detail below with respect to FIGS. 2-4.

Figure 2:
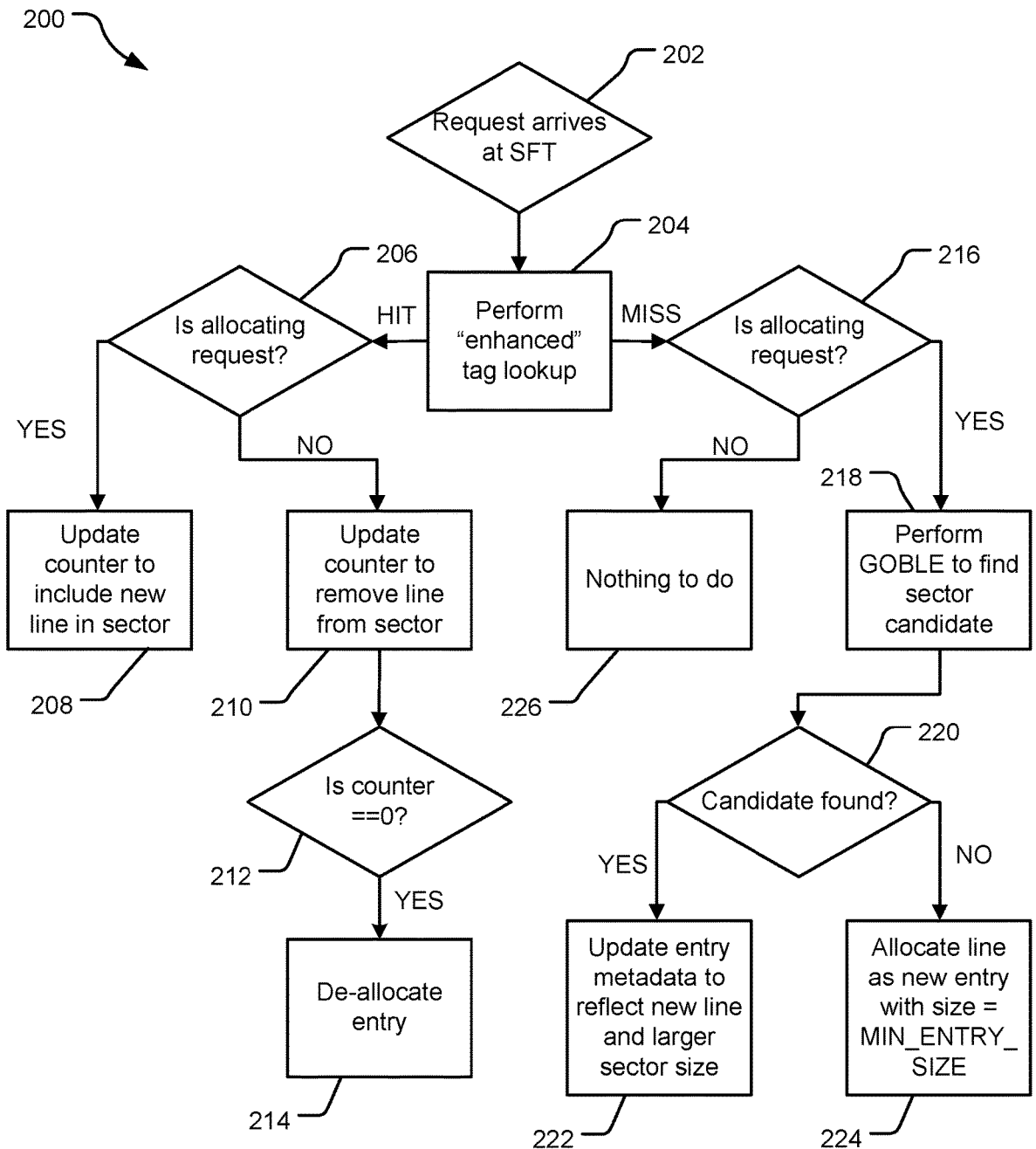

FIG. 2 discloses operations 200 of the cache coherence system disclosed herein providing dynamic coarse-grained tracking. Specifically, the operations 200 implement a greed and opportunity-based line expander (GOBLE) algorithm that proactively seeks to create sectors of all cachelines. GOBLE is an aggressive algorithm that may be preferred by applications that have large contiguous footprints. The aggressive nature of the algorithm is reflected in the decision to aggregate entries even if free SFT entries are available.

An operation 202 determines if an incoming request has arrived at the SFT for a sector match. Specifically, the incoming request may have a tag for a sector of the L2 memory that needs to be compared with the existing tags stored in the SFT entries.

In response to receiving an incoming request, an operation 204 performs an enhanced tag lookup to determine if there was HIT or a MISS. A tag lookup involves pairing incoming address bits or a section of the incoming address bits against the tags of the SFT entries to determine if there is a match. The enhanced tag lookup operation 204 specifically operates with coarse-grained SFT entries. Specifically, for coarse-grained SFT entries, the tags may map to two or more cachelines. For example, if the SFT entries are 128 bytes each tag of the SFT entry maps to two 64 byte cachelines.

Specifically, during tag lookup, each tag needs to be compared with the incoming requests tag for a sector match which is defined as:

(IN_ADDR>>LOG2(SECTOR_SIZE))==
(TAG_ADDR>>LOG2(SECTOR_SIZE))

Where, IN_ADDR is the incoming address, TAG_ADDR is the full address of the stored SFT entry, and SECTOR_SIZE is the value in bytes read from metadata and it may range from MIN_ENTRY_SIZE to MAX_SECTOR_SIZE.

The enhanced tag lookup finds HIT if the incoming entry is within an existing entry's sector size. In this case, a new SFT entry is not required, and the counter corresponding to the SFT entry that received the hit is updated. If the enhanced tag lookup finds a HIT, subsequently an operation 206 determines if the incoming request is an allocating request.

If the incoming request is an allocating request, an operation 208 updates a counter to include a new cacheline in the sector. Here an allocating request is defined as a request where a cache of an agent needs to allocate a cacheline and as a result the SFT must maintain tracking of the cacheline in correspondence to the agent requesting the allocation. This results in an allocation into the SFT. Here the counter is a metadata field of the SFT entry that counts up to the number of cachelines that can be tracked by an SFT entry. Specifically, the counter tracks how many of the cachelines in the sector has been accessed so far. Thus, for sector size of two cachelines per SFT entry, the counter can have value of one (1) for the first cacheline and two (2) for the second cacheline.

If the incoming request is not an allocating request, an operation 210 updates the counter to remove a line from the sector by decreasing the counter value. An incoming request is a non-allocating request where cache of an agent relinquishes a cacheline. In this case, the SFT needs to update the tracking information of the cacheline. Subsequently, an operation 212 determines if the counter is equal to zero (0). If the counter is equal to zero, an operation 214 deallocates or removes the SFT entry from the SFT.

If none of the existing sectors covers the incoming address IN_ADDR the operation 204 determines it as a MISS. If the enhanced tag lookup finds a MISS, subsequently an operation 216 determines if the incoming request is an allocating request or not. If the incoming request is not an allocating request, as per operation 226, no further action is necessary.

However, if the operation 216 determines that the incoming request is an allocating request, an operation 218 performs a GOBLE to find a candidate sector.

Subsequently, an operation 220 determines if the GOBLE operation found a candidate sector. If the GOBLE operation found a candidate sector, an operation 222 updates the SFT entry metadata to reflect a new line and larger sector size.

If the GOBLE operation does not find a candidate sector, an operation 224 allocates a line as a new SFT entry with its size field set to MIN_ENTRY_SIZE.

Figure 3:
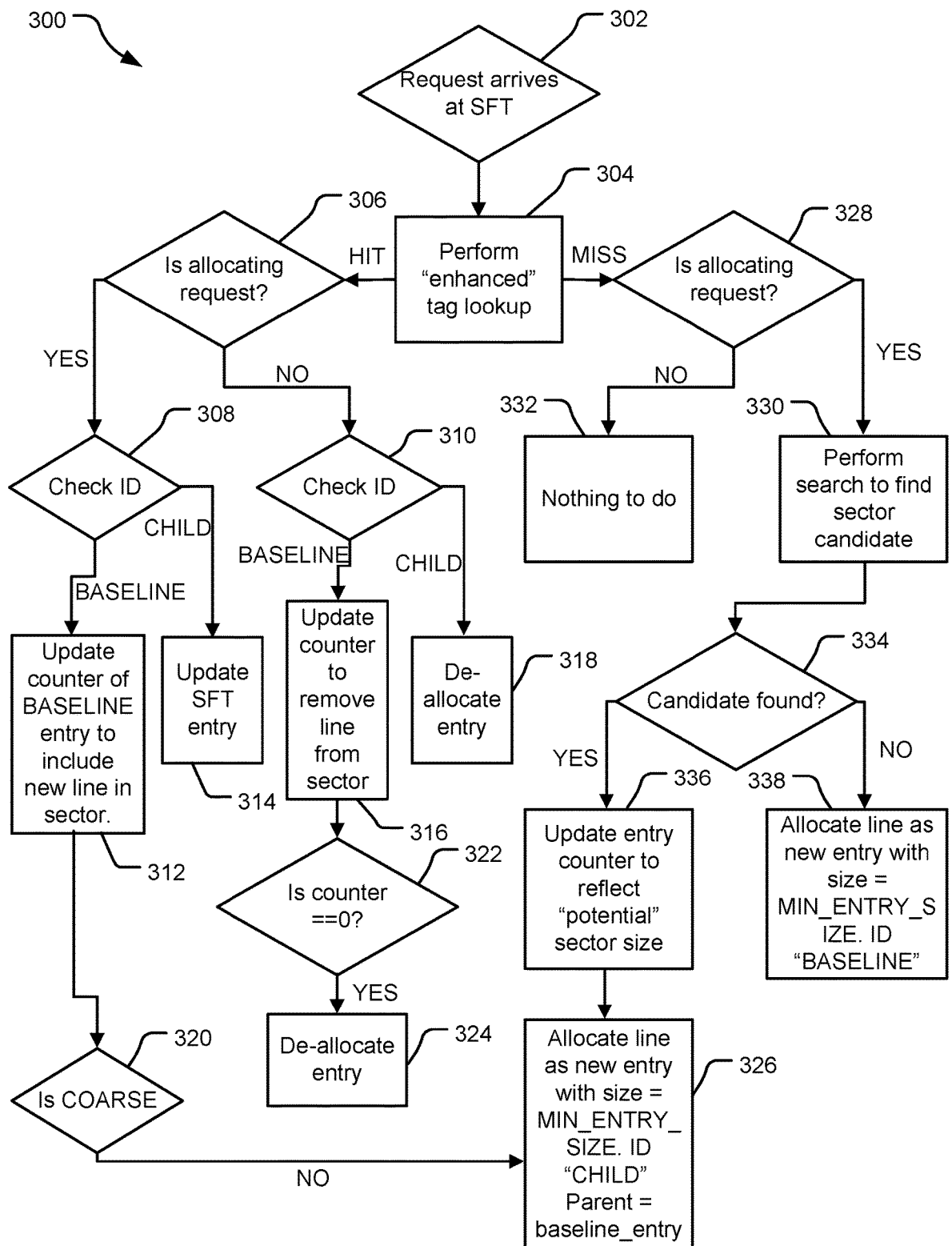

FIG. 3 discloses alternative operations 300 of the cache coherence system disclosed herein providing dynamic coarse-grained tracking. The operations 300 may be directed to performing line aggregations at eviction (LASE). The operations 300 allows a normal SFT operation until the point that SFT evictions are required. On eviction, the operations 300 tries to group together entries into a single coarse-grained entry. This allows creating space for new allocations without requiring back-invalidate entries from the private cache of an agent. Specifically, the operations allow creating sectors in a manner such that the sectors are created only when there is pressure on the SFT. In the context of SFT, pressure is defined as the scenario where the SFT capacity is insufficient to track the lines in private caches and as a result requires selection of victims from the SFT to create space. Compared to that, the GOBLE operations illustrated in FIG. 2 guarantees creation of sectors in any scenario.

While the LASE operations disclosed in FIG. 3 tracks potential sectors in the SFT, an SFT entry is converted to an aggregated (or sectored) entry only the victim eviction phase. Subsequently, a coarse SFT entry may behave in a manner similar to its behavior as per the GOBLE operations. However, in the case of LASE implementation, because the fine grained SFT entries are kept around longer, there is a greater probability of minimizing useless back-invalidations. Furthermore, as a result, there is no need to perform a sector degradation scrub for keeping the over-snooping overhead low.

An operation 302 determines if an incoming request has arrived at the SFT for a sector match. Specifically, the incoming request may have a tag for a sector of the L2 memory that needs to be compared with the existing tags stored in the SFT entries. In response to receiving an incoming request, an operation 304 performs an enhanced tag lookup to determine if there was HIT or a MISS. The enhanced tag lookup of operation 304 may be substantially similar to the enhanced tag lookup further discussed above with respect to operation 204 of FIG. 2.

If the enhanced tag lookup results in a HIT in the SFT, this case indicates that the incoming cacheline can be covered by an existing sector entry. In one case the SFT entry that is HIT may have its COARSE field=TRUE, indicating that there already exists a COARSE entry to absorb the new cacheline allocation request to the HIT entry. Alternatively, the SFT entry that is HIT may have its COARSE field=FALSE, the counter of the hit entry is updated, and the incoming cacheline allocation request is allocated to as SFT entry as an independent entry with its ID field set to CHILD and a pointer to the HIT entry as a PARENT. If the enhanced tag lookup results in a MISS, the incoming cacheline allocation request is allocated as a new entry with ID=BASELINE.

Specifically, if there is a HIT, a determining operation 306 determines if the incoming request is an allocating request. In response to determining that the incoming request is an allocating request, an operation 308 checks the ID field of the SFT entry. The ID field may be Boolean entry that takes the value of either BASELINE or CHILD. The value BASELINE represents that an SFT entry may become a coarse entry. The value CHILD represents that the SFT entry may be covered by another BASELINE entry, i.e., another entry having TAG value of BASELINE. Additionally, with LASE algorithm an SFT entry also has an additional metadata field COARSE, which is a Boolean field, and it denotes whether the entry is in coarse mode or not. Particularly, the COARSE field may be set only for an SFT entry where the ID field is set to BASELINE. Furthermore, a PARENT field contains a way ID of an entry that serves as the BASELINE for a child SFT entry. Particularly, the PARENT field is valid only for an SFT entry with ID field set to CHILD.

If the operation 308 determines the value of the ID field to be BASELINE, such that the SFT entry may become a coarse entry, an operation 312 updates the counter of such BASELINE SFT entry to include a new line in the sector. Subsequently, an operation 320 determines if the SFT entry is a coarse entry. If the SFT entry is not a coarse entry, an operation 326 allocates cacheline as a new entry in the SFT and sets the size=MIN_ENTRY_SIZE, ID=CHILD, and parent=Baseline_entry. Here the parent field indicates the way ID of the entry that serves as the Baseline_entry for the given child entry.

If the operation 308 determines the value of the ID field of the SFT entry to be CHILD, so that SFT entry may be covered by another BASELINE entry, an operation 314 updates the SFT entry similar to a SFT hit in the baseline implementation.

If the determining operation 306 determines that the incoming request is not an allocating request, an operation 310 evaluates the ID field of the SFT entry. If the ID field has a value CHILD, an operation 318 indicates that the SFT entry is de-allocated. If the ID field has a value BASELINE, an operation 316 updates the counter to remove the cacheline from the sector by decreasing the counter value. Subsequently, an operation 322 determines if the counter is equal to zero (0). If the counter is equal to zero, an operation 324 deallocates or removes the SFT entry from the SFT.

If none of the existing sectors covers the incoming address IN_ADDR the operation 304 determines it as a MISS. If the enhanced tag lookup finds a MISS, subsequently an operation 328 determines if the incoming request is an allocating request or not. If the incoming request is not an allocating request, as per operation 332, no further action is necessary. However, if the operation 328 determines that the incoming request is an allocating request, an operation 330 performs a search to find a candidate sector.

If a candidate sector is found (Yes arrow of operation 334), an operation 336 updates metadata of the SFT entry to reflect the potential sector size. Subsequently the operation 326 allocates cacheline as a new entry in the SFT. If no candidate sector is found (No arrow of operation 334), an operation 338 allocates the cacheline as a new SFT entry and sets the metadata of the new SFT entry with size=MIN_ENTRY_SIZE, ID=BASELINE.

Figure 4:
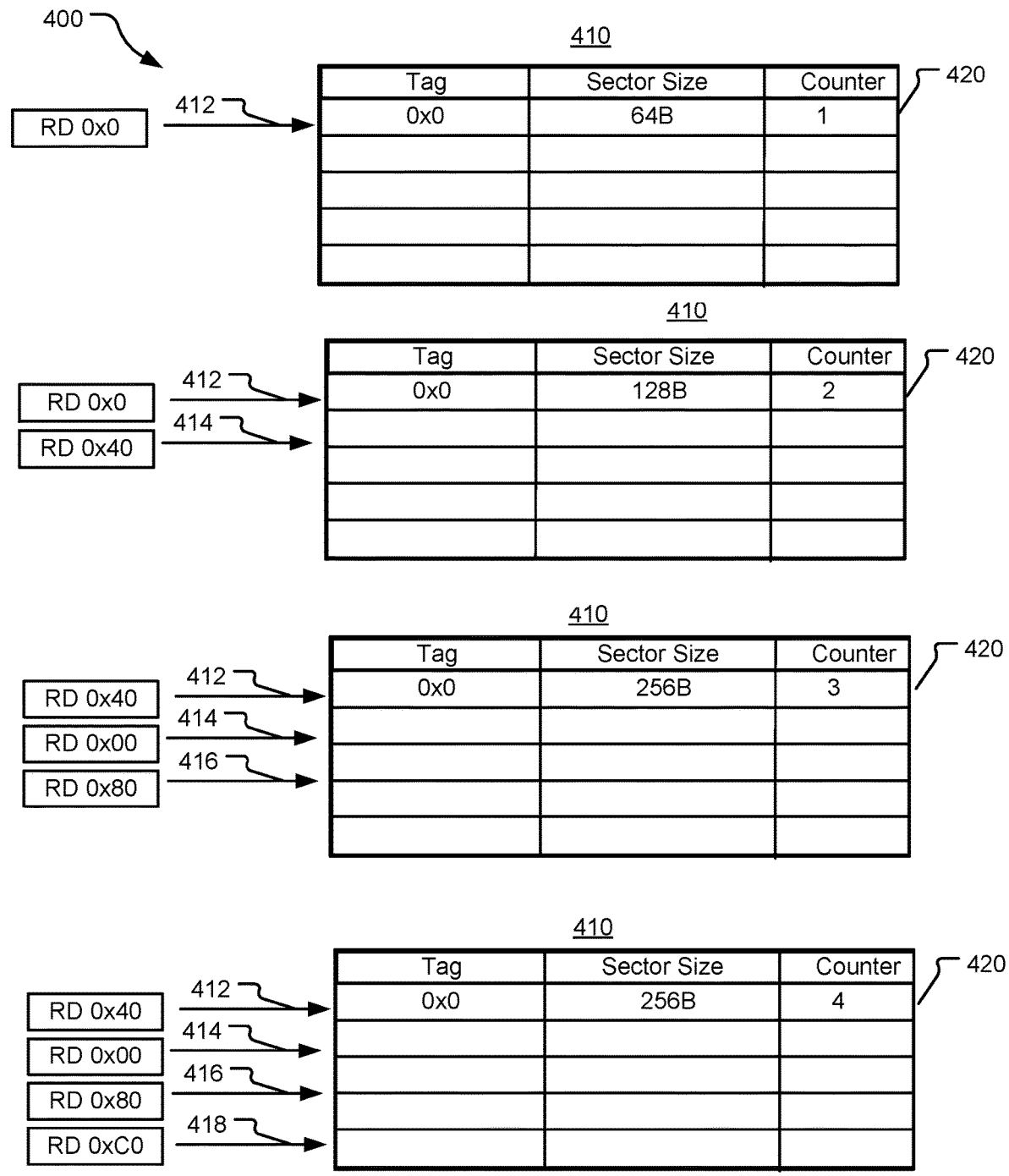
FIG. 4 illustrates example flow of data in a snoop filter entry illustrating sequential access stream of requests.

FIG. 4 illustrates flow of data 400 in snoop filter entries illustrating sequential access stream of requests. For example, a first request 412 for read at cacheline 0x0 is an allocating request to an SFT 410. In this case, the request 412 is a true miss in that none of the SFT entries is tracking the incoming cacheline. Here the size of the cacheline is assumed to be 64B and the maximum sector size of the SFT entries is programmed to be 512B. In the given implementation, the maximum sector size value can be programmable by changing one or more registers on the SoC.

The tag of the incoming request is added to the tag field of the SFT entry and the 420, the sector size is updated to be 64B, and the counter is incremented to 1. Subsequently, a second incoming request 414 may be for read operation at a cacheline at 0x40. Again, there is no existing entry in the SFT table 410, but there is a sector hit in that the SFT entry 420 can grow. Therefore, as per the implementation disclosed herein, the sector size of the SFT entry 420 is changed to 128B and the counter is incremented to 2.

Subsequently, the next allocating request 416 is for a read operation at a cacheline at 0x80. Given that the sector size of the SFT entry 420 is still below maximum sector size of 512B, the cacheline at 0x80 is also allocated to SFT entry 420 and the sector size is incremented to 256B to indicate four cachelines, but the counter is incremented to three (3) to indicate tracking the three cachelines at 0x0, 0x40, and 0x80 being tracked.

The next read request 418 at cacheline 0xC0 is a sector hit in that the tag TAG_ADDR stored at the SFT entry 420 does not correspond to the incoming address IN_ADDR of the incoming request, but the tag in conjugation with the sector size matches the IN_ADDR. In other words, the following condition is satisfied:

(IN_ADDR>>LOG2(SECTOR_SIZE))==
(TAG_ADDR>>LOG2(SECTOR_SIZE)).

Here SECTOR_SIZE is the values in bytes read from the metadata of the SFT entry 420, which can range from MIN_ENTRY_SIZE to MAX_SECTOR_SIZE. Specifically, the SFT entry 420 tracks four cachelines starting at address 0x0 and the incoming request 418 is for the fourth cacheline at address 0xC0. Therefore, the cacheline for the incoming request 418 is absorbed into the SFT entry 420 and the counter is incremented by one (1) to four (4).

Figure 5:
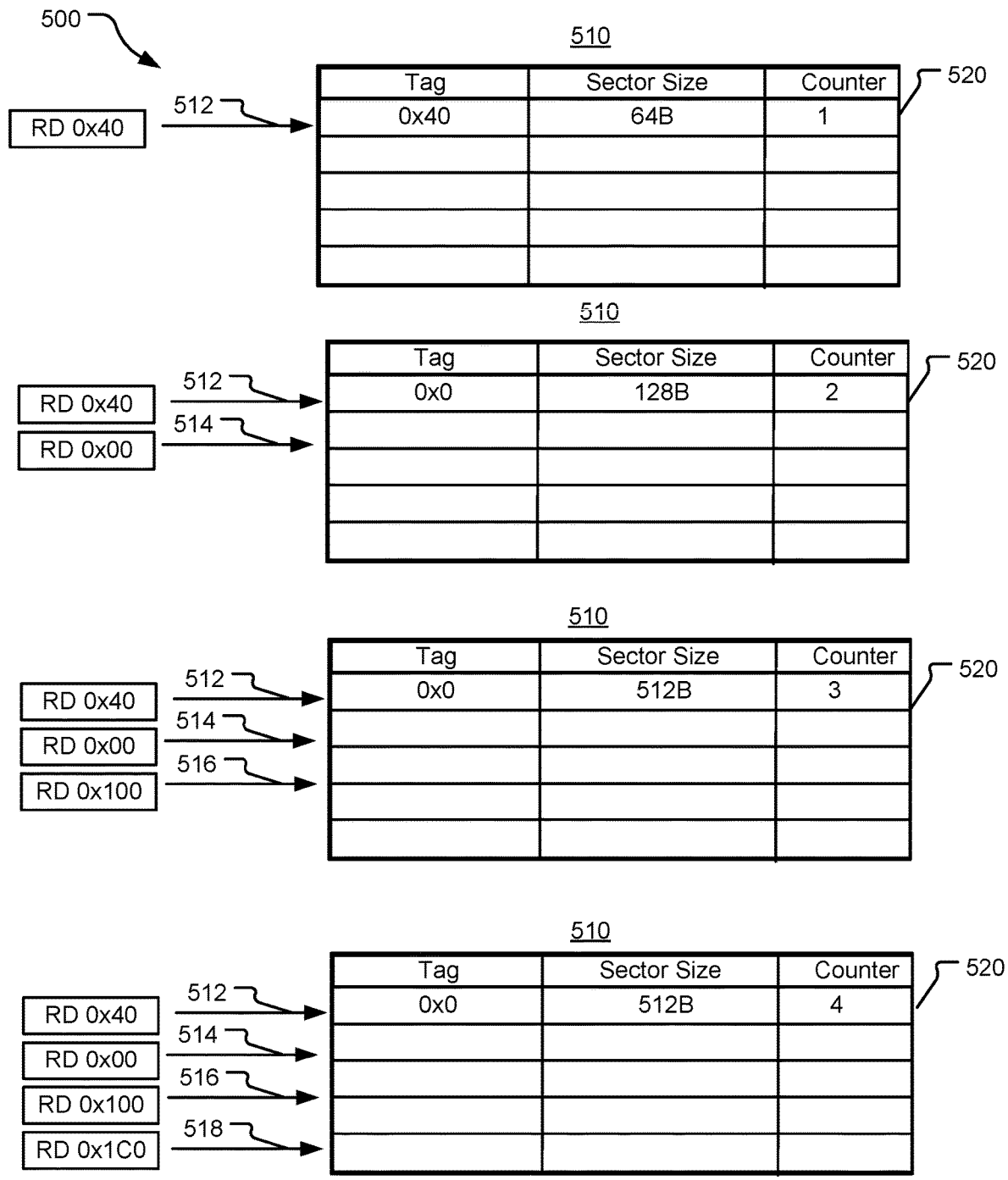
FIG. 5 illustrates example flow of data in a snoop filter entry illustrating stream of requests with gap in the access requests.

FIG. 5 illustrates flow of data in a snoop filter entries 500 illustrating stream of requests with gap in the access requests. Here the maximum_sector_size for the SFT entries 500 is programmed to be 1024B. For example, a first request 512 for read at cacheline 0x40 is an allocating request to an SFT 510 for a 64B cacheline. This is a true miss in that there is no SFT entry that matches the IN_ADDR of the incoming allocating request 512. The tag of the incoming request is added to the tag field of the SFT entry and the 520, the sector size is updated to be 64B, and the counter is incremented to 1.

Subsequently, a second incoming request 514 may be for read operation at a cacheline at 0x00. Again, there is no existing entry in the SFT table 510, but there is a sector hit in that the SFT entry 520 can grow. Therefore, as per the implementation disclosed herein, the sector size of the SFT entry 520 is changed to 128B and the counter is incremented to 2. Subsequently, the next allocating request 516 is for a read operation at a cacheline at 0x100. Again, there is no existing entry in the SFT table 510, but there is a sector hit in that the SFT entry 520 can grow and given the cacheline address of 0x100, the sector size of the SFT entry 510 is increased to 512B and the counter is increased to 3 Finally, incoming request 518 is for a read operation for cacheline at 0x1C0. Here again, no SFT entries have any matching tag address, however, SFT entry 510 stores the sector of the incoming request, therefore, the cacheline at 0x1C0 is allocated to SFT entry 510. There is no need to increase the sector size, however, the counter is incremented to 4.

Figure 6:
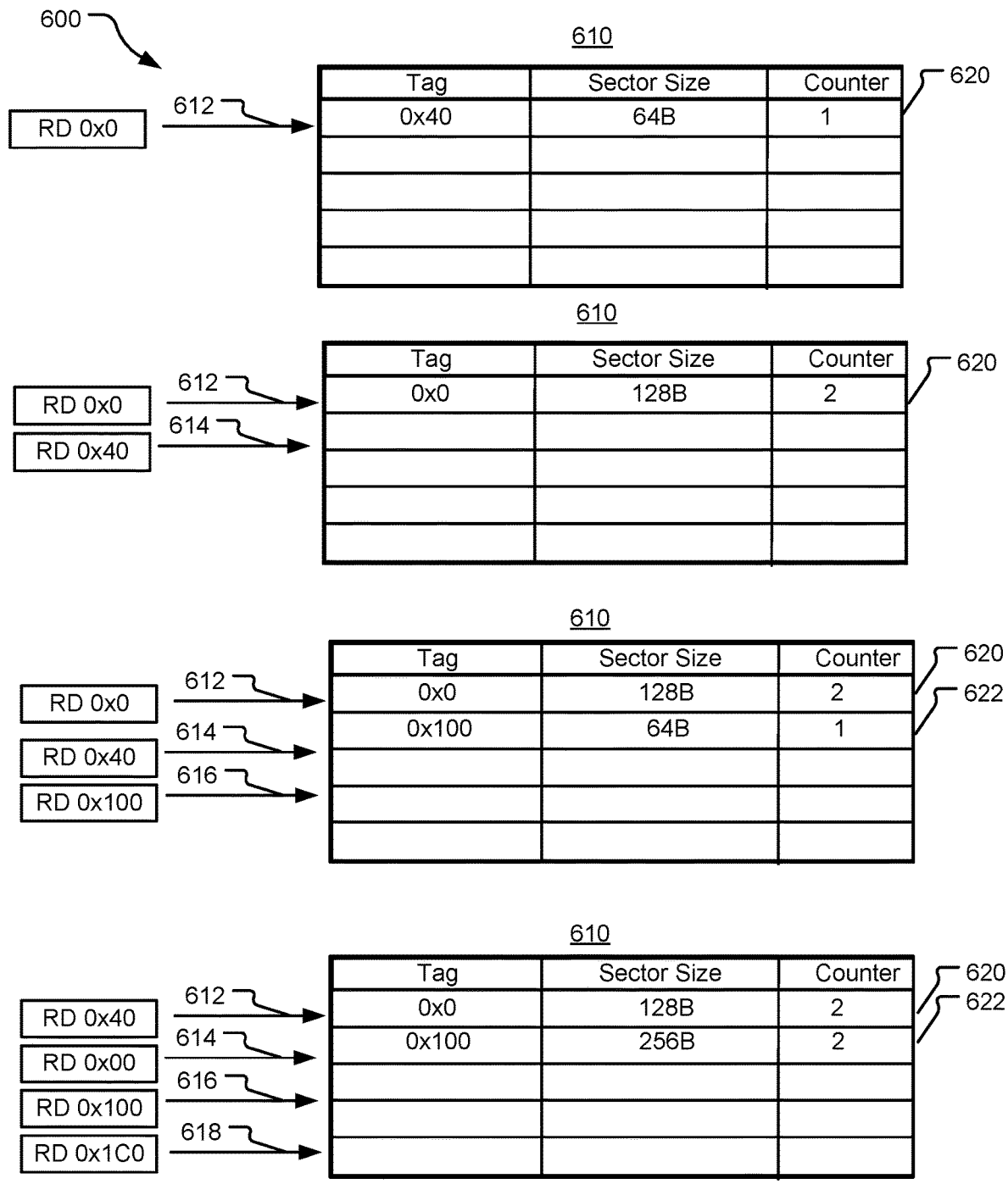
FIG. 6 illustrates example flow of data in a snoop filter entry illustrating stream of requests with sector size restriction on the snoop filter.

FIG. 6 illustrates flow of data 600 in snoop filter entries illustrating stream of requests that may hit sector size restriction on the snoop filter. Here the maximum_sector_size for the SFT entries 500 is programmed to be 256B. For example, a first request 612 for read at cacheline 0x0 is an allocating request to an SFT 610. In this case, the request 612 is a true miss in that none of the SFT entries is tracking the incoming cacheline. The tag of the incoming request is added to the tag field of the SFT entry and the 620, the sector size is updated to be 64B, and the counter is incremented to 1.

Subsequently, a second incoming request 614 may be for read operation for a cacheline at 0x40. Again, there is no existing entry in the SFT table 610, but there is a sector hit in that the SFT entry 620 can grow. Therefore, as per the implementation disclosed herein, the sector size of the SFT entry 620 is changed to 128B and the counter is incremented to 2. The third request 616 is for a read operation at cacheline 0x100. Again, there is no existing entry in the SFT table 610 and the maximum_sector_size is 256B. Therefore, the third request 616 cannot be allocated to the SFT entry 620 and it is allocated to a new SFT entry 622, the sector size of the new SFT entry 622 is changed to 64B and its counter is set to 1.

Subsequently, the fourth incoming request 618 is for a read at cacheline 0x1C0. there is no existing entry in the SFT table 610, but there is a sector hit in that the SFT entry 622 can grow. Therefore, as per the implementation disclosed herein, the sector size of the SFT entry 622 is changed to 256B and the counter is incremented to 2. Thus, at this point, the SFT entries 620 and 622 may coexist in the SFT 610.

Figure 7:
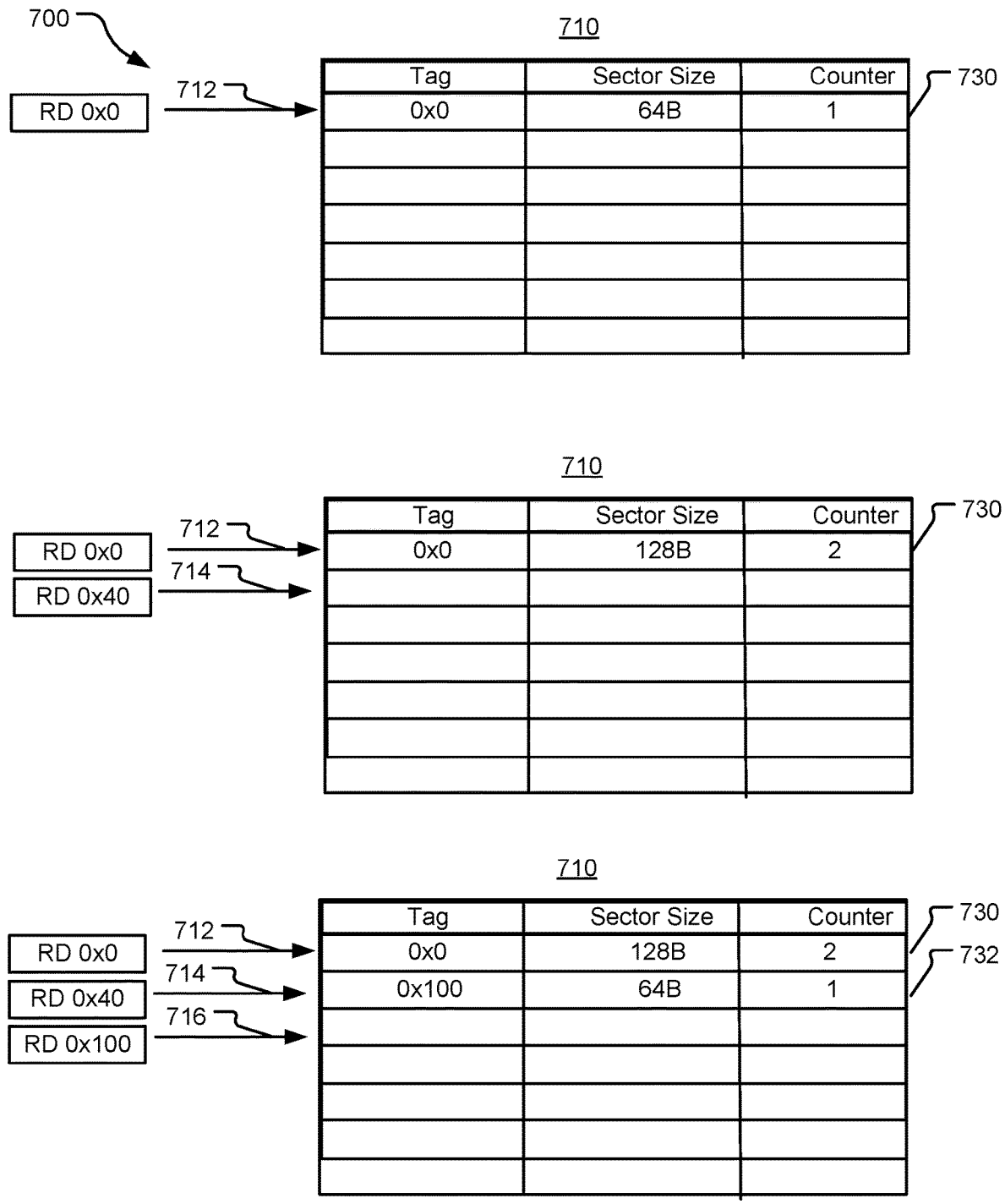
FIGS. 7 and 8 illustrates example flow of data in a snoop filter entry illustrating write-back requests.
Figure 8:
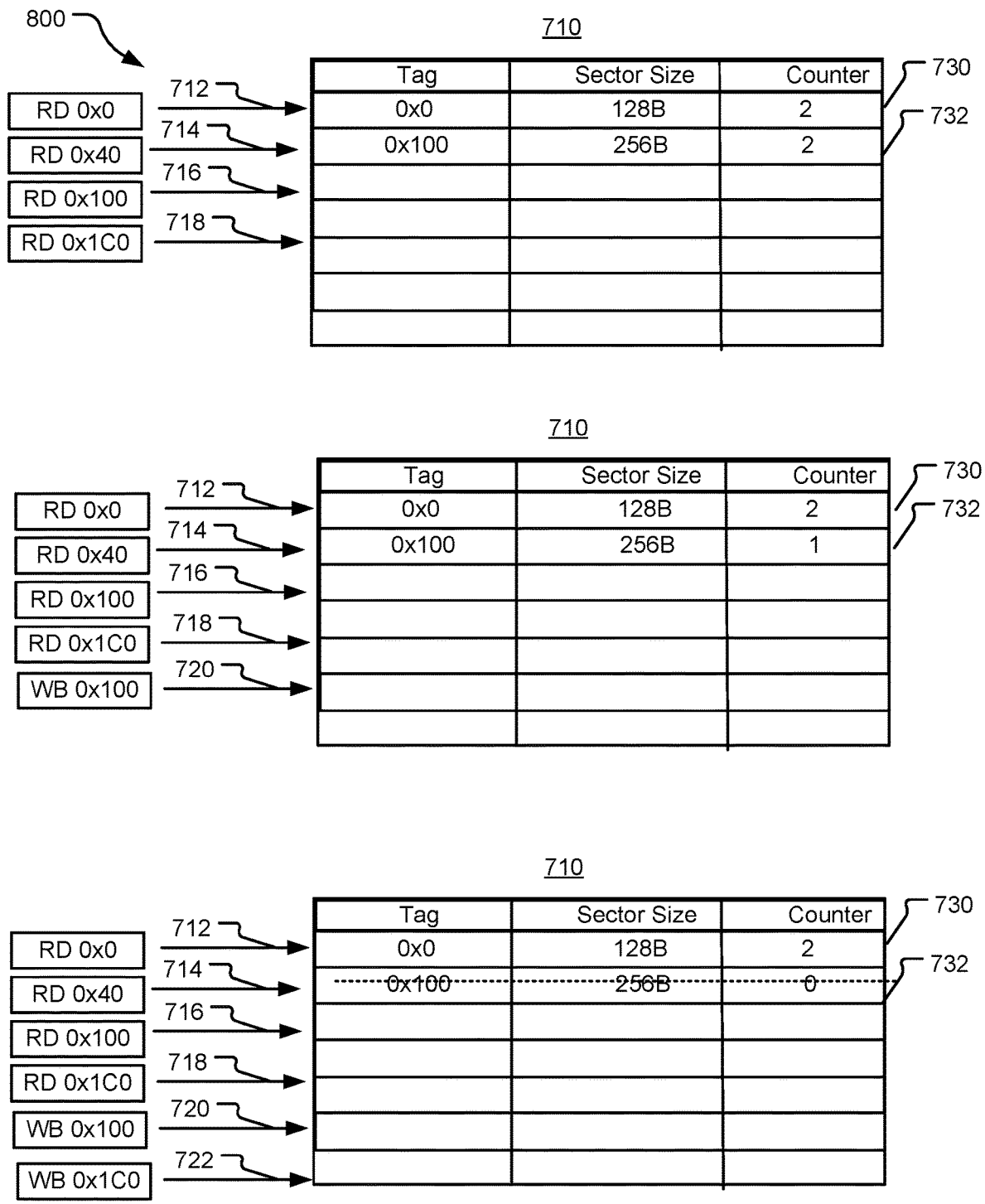

FIGS. 7 and 8 illustrates flow of data 700 and 800 in snoop filter entries illustrating write-back requests when commands are not allocated. Here the maximum sector size for the SFT entries 700 is programmed to be 256B. For example, a first request 712 for read at cacheline 0x0 is an allocating request to an SFT 710. In this case, the request 712 is a true miss in that none of the SFT entries is tracking the incoming cacheline. The tag of the incoming request is added to the tag field of the SFT entry and the 730, the sector size is updated to be 64B, and the counter is incremented to one (1).

Subsequently, a second incoming request 714 may be for read operation for a cacheline at 0x40. Again, there is no existing entry in the SFT 710, but there is a sector hit in that the SFT entry 730 can grow. Therefore, as per the implementation disclosed herein, the sector size of the SFT entry 730 is changed to 128B and the counter is incremented to 2. The third request 716 is for a read operation at cacheline 0x100. Again, there is no existing entry in the SFT table 610 and the maximum_sector_size is 256B. Therefore, the third request 716 cannot be allocated to the SFT entry 730 and it is allocated to a new SFT entry 732, the sector size of the new SFT entry 732 is changed to 64B and its counter is set to 1.

Subsequently, the fourth incoming request 718 is for a read at cacheline 0x1C0. there is no existing entry in the SFT table 710, but there is a sector hit in that the SFT entry 732 can grow. Therefore, as per the implementation disclosed herein, the sector size of the SFT entry 732 is changed to 256B and the counter is incremented to 2. Thus, at this point, the SFT entries 730 and 732 may coexist in the SFT table 710.

The subsequent incoming request 720 may be for a write-back (WB) at cacheline 0x100. In this case, the counter at the second SFT entry 732 is decremented by one (1) to one (1). The subsequent incoming request 722 may be for a write-back (WB) at cacheline 0x1C0. In this case, the counter at the second SFT entry 732 is decremented by one (1) to zero (0), the sector size value is deleted, and the SFT entry 732 is freed now for use again.

Figure 9:
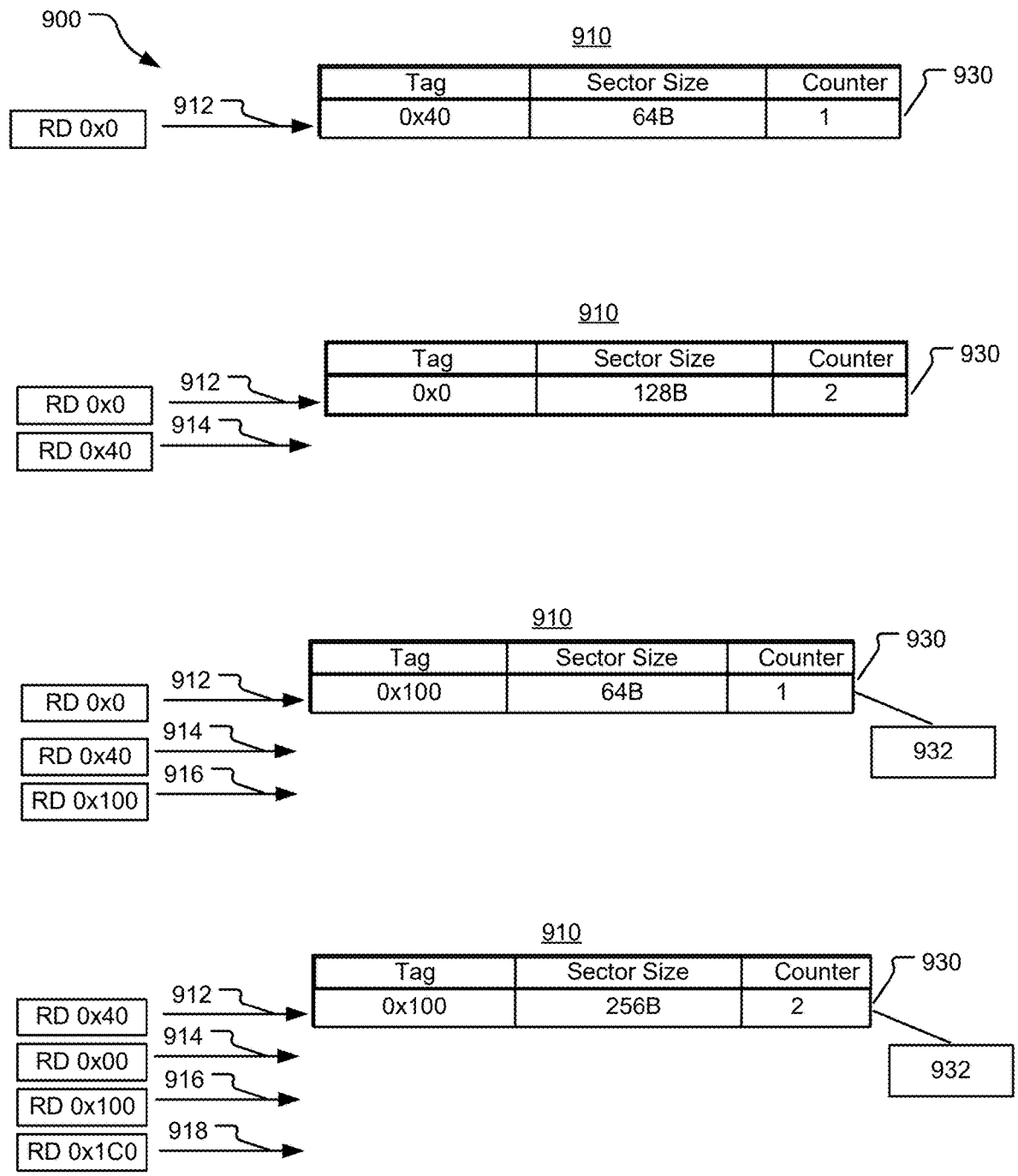
FIG. 9 illustrates example flow of data in a snoop filter entry illustrating stream of requests with back invalidation.

FIG. 9 illustrates flow of data 900 in snoop filter entries illustrating stream of requests with back invalidation from private cache of an agent CPU. Here the maximum_sector_size for the SFT entries 900 is programmed to be 256B. For example, a first request 912 for read at cacheline 0x0 is an allocating request to an SFT 910. In this case, the request 912 is a true miss in that none of the SFT entries is tracking the incoming cacheline. The tag of the incoming request is added to the tag field of the SFT entry and the 930, the sector size is updated to be 64B, and the counter is incremented to one (1).

Subsequently, a second incoming request 914 may be for read operation for a cacheline at 0x40. Again, there is no existing entry in the SFT 910, but there is a sector hit in that the SFT entry 930 can grow. Therefore, as per the implementation disclosed herein, the sector size of the SFT entry 930 is changed to 128B and the counter is incremented to 2. The third request 916 is for a read operation at cacheline 0x100. Because the sector size is restricted to 256B, the system needs to evict the existing cacheline allocation from the SFT entry 930 to allocate the cacheline of the incoming request 916. Because the counter value of the SFT entry 930 is two (2), the eviction results in two back invalidations. Subsequently, the new cacheline of the incoming request 916 is allocated to the SFT entry 930, with its sector size changed to 64B and the counter value set to one (1).

Subsequently, the next incoming request may be a for a read at cacheline 0x1C0. there is no existing entry in the SFT table 910, but there is a sector hit in that the SFT entry 930 can grow. Therefore, as per the implementation disclosed herein, the sector size of the SFT entry 930 is changed to 256B and the counter is incremented to two (2).

Figure 10:
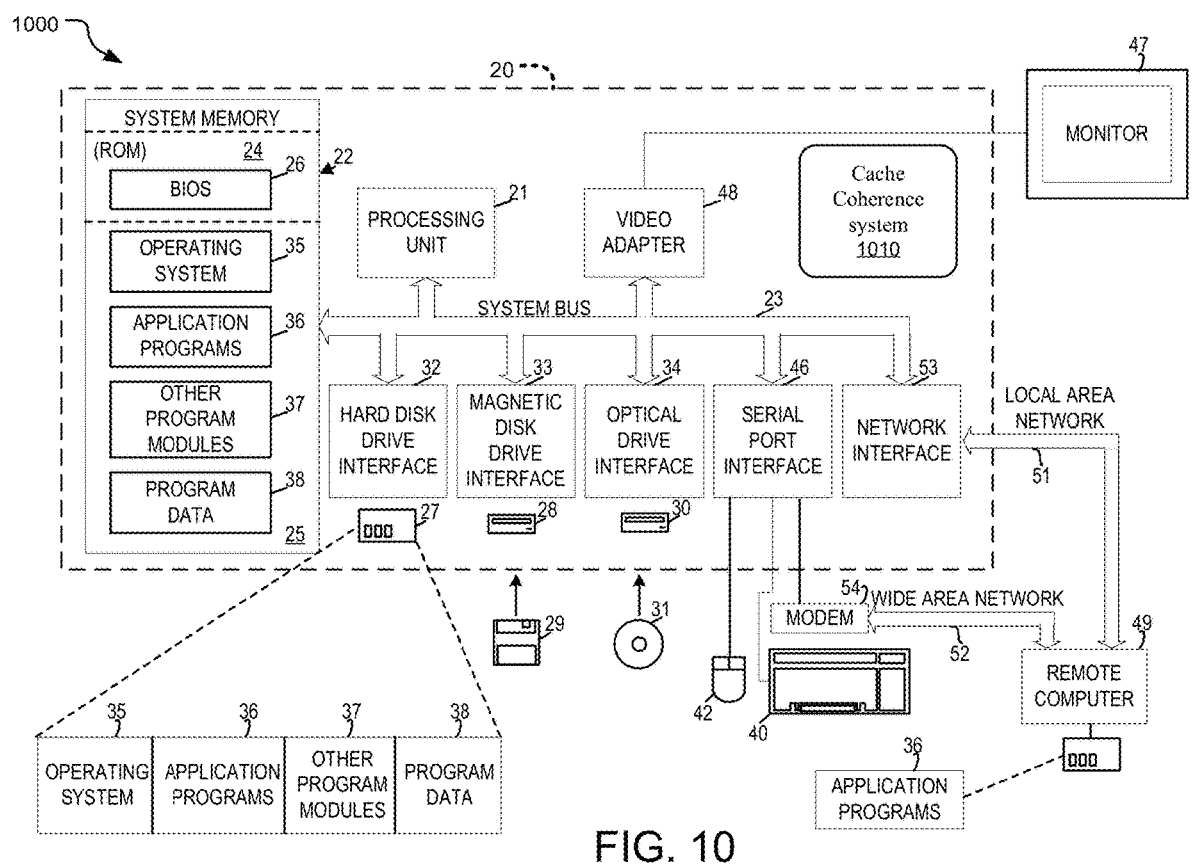
FIG. 10 illustrates an example system that may be useful in implementing the cache coherence system disclosed herein.

FIG. 10 illustrates an example system 1000 that may be useful in implementing the cache coherence system disclosed herein. The example hardware and operating environment of FIG. 10 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 10, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a cache coherence disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 2 and 3. Similarly, instructions stored on the memory of the computer 20 may also be used to implement one or more operations of FIGS. 2 and 3. The memory of the computer 20 may also one or more instructions to implement the cache coherence system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the cache coherence system 1010 may be stored in system memory 22 and/or storage devices 29 or 31 and processed by the processing unit 21. Cache coherence operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of cache coherence may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The cache coherence disclosed herein may include a variety of tangible computer-readable storage media and intangible computer-readable communication signals. Tangible computer-readable storage can be embodied by any available media that can be accessed by the cache coherence system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the cache coherence system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation disclosed herein provides a method including receiving a request for allocating an incoming cacheline to one of a plurality of SFT entries in a snoop filter (SFT), performing a tag lookup function for a tag of the incoming cacheline in the SFT, in response to determining that the incoming cacheline is not part of an existing sector of any of the plurality of SFT entries, finding one or more candidate SFT entries, wherein the candidate SFT entries can be converted to an aggregated entry, selecting one of the candidate SFT entries, and allocating the incoming cacheline to the selected SFT entry.

In an alternative implementation the technology disclosed herein includes one or more physically manufactured computer-readable storage media, encoding computer-executable instructions for executing on a computer system a computer process, the computer process including receiving a request for allocating an incoming cacheline to one of a plurality of SFT entries in a snoop filter (SFT), performing a tag lookup function for a tag of the incoming cacheline in the SFT, in response to determining that the incoming cacheline is not part of an existing sector of any of the plurality of SFT entries, finding one or more candidate SFT entries, wherein the candidate SFT entries can be converted to an aggregated entry, selecting one of the candidate SFT entries, and allocating the incoming cacheline to the selected SFT entry.

In another implementation the technology disclosed herein includes a system with a memory, one or more processing units, and a cache coherence system stored in the memory and executable by the one or more processor units, the cache coherence system encoding computer-executable instructions on the memory for executing on the one or more processor units a computer process, the computer process including receiving a request for allocating an incoming cacheline to one of a plurality of SFT entries in a snoop filter (SFT), performing a tag lookup function for a tag of the incoming cacheline in the SFT, in response to determining that the incoming cacheline is not part of an existing sector of any of the plurality of SFT entries, finding one or more candidate SFT entries, wherein the candidate SFT entries can be converted to an aggregated entry, selecting one of the candidate SFT entries, and allocating the incoming cacheline to the selected SFT entry.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
   receiving a request for allocating an incoming cacheline to one of a plurality of SFT entries in a snoop filter (SFT);
   performing a tag lookup function for a tag of the incoming cacheline in the SFT,
   in response to determining that the incoming cacheline is not part of an existing sector of any of the plurality of SFT entries, finding one or more candidate SFT entries, wherein the candidate SFT entries can be converted to an aggregated entry;
   selecting one of the candidate SFT entries; and
   allocating the incoming cacheline to the selected SFT entry,
   wherein finding one or more candidate SFT entries further comprises finding one or more candidate SFT entries wherein a sector size is less than a predetermined maximum sector size.

2. The method of claim 1, further comprising increasing value of a sector size in the selected SFT entry to indicate inclusion of the new cacheline in the SFT, wherein the sector size is part of SFT entry metadata.

3. The method of claim 2, wherein in response to determining that the incoming cacheline is not part of an existing sector of any of the plurality of SFT entries and determining that none of the plurality of SFT entries can be converted to an aggregated entry:
   allocating a new SFT entry to the incoming cacheline; and
   setting the value of the sector size of the new SFT entry to minimum_entry_size.

4. The method of claim 1, wherein the value of the predetermined maximum sector size is programmable by setting one or more registers.

5. The method of claim 1, wherein selecting one of the candidate SFT entries further comprises evaluating value of sector size stored in the metadata of the plurality of SFT entries, the sector size value of a given SFT entry indicating a size of a sector being tracked by the given SFT entry.

6. The method of claim 5, wherein selecting one of the candidate SFT entries further comprises selecting one of the candidate SFT entries with the smallest value of the sector size.

7. The method of claim 1, further comprising:
   in response to determining that the incoming cacheline is part of an existing sector of given one of the plurality of SFT entries, allocating the incoming cacheline to the given one of the plurality of SFT entries and increasing value of a tracking counter for the given one of the plurality of SFT entries.

8. One or more physically manufactured computer-readable storage media, encoding computer-executable instructions for executing on a computer system a computer process, the computer process comprising:
   receiving a request for allocating an incoming cacheline to one of a plurality of SFT entries in a snoop filter (SFT);
   performing a tag lookup function for a tag of the incoming cacheline in the SFT,
   in response to determining that the incoming cacheline is not part of an existing sector of any of the plurality of SFT entries, finding one or more candidate SFT entries, wherein the candidate SFT entries can be converted to an aggregated entry;
   selecting one of the candidate SFT entries; and
   allocating the incoming cacheline to the selected SFT entry,
   wherein the computer process further comprising increasing value of a sector size in the selected SFT entry to indicate inclusion of the new cacheline in the SFT, wherein the sector size is part of SFT entry metadata.

9. The one or more physically manufactured computer-readable storage media of claim 8, wherein finding one or more candidate SFT entries further comprises finding one or more candidate SFT entries wherein the sector size is less than a predetermined maximum sector size.

10. The one or more physically manufactured computer-readable storage media of claim 8, wherein selecting one of the candidate SFT entries further comprises evaluating value of sector size stored in the metadata of the plurality of SFT entries, the sector size value of a given SFT entry indicating a size of a sector being tracked by the given SFT entry.

11. The one or more physically manufactured computer-readable storage media of claim 8, wherein selecting one of the candidate SFT entries further comprises selecting one of the candidate SFT entries with the smallest value of the sector size.

12. The one or more physically manufactured computer-readable storage media of claim 8, wherein the computer process further comprising:
   in response to determining that the incoming cacheline is part of an existing sector of given one of the plurality of SFT entries, allocating the incoming cacheline to the given one of the plurality of SFT entries and increasing value of a tracking counter for the given one of the plurality of SFT entries.

13. The one or more physically manufactured computer-readable storage media of claim 8, wherein in response to determining that the incoming cacheline is not part of an existing sector of any of the plurality of SFT entries and determining that none of the plurality of SFT entries can be converted to an aggregated entry:
   allocating a new SFT entry to the incoming cacheline; and
   setting the value of the sector size of the new SFT entry to minimum_entry_size.

14. A system comprising:
   memory;
   one or more processor units; and
   a cache coherence system stored in the memory and executable by the one or more processor units, the cache coherence system encoding computer-executable instructions on the memory for executing on the one or more processor units a computer process, the computer process comprising:
      receiving a request for allocating an incoming cacheline to one of a plurality of SFT entries in a snoop filter (SFT);
      performing a tag lookup function for a tag of the incoming cacheline in the SFT,
      in response to determining that the incoming cacheline is not part of an existing sector of any of the plurality of SFT entries, finding one or more candidate SFT entries, wherein the candidate SFT entries can be converted to an aggregated entry;
      selecting one of the candidate SFT entries; and
      allocating the incoming cacheline to the selected SFT entry,
      wherein selecting one of the candidate SFT entries further comprises evaluating value of sector size stored in the metadata of the plurality of SFT entries, the sector size value of a given SFT entry indicating a size of a sector being tracked by the given SFT entry.

15. The system of claim 14, wherein the computer process further comprising increasing value of a sector size in the selected SFT entry to indicate inclusion of the new cacheline in the SFT, wherein the sector size is part of SFT entry metadata.

16. The system of claim 14, wherein finding one or more candidate SFT entries further comprises finding one or more candidate SFT entries wherein the sector size is less than a predetermined maximum sector size.

17. The system of claim 14, wherein selecting one of the candidate SFT entries further comprises selecting one of the candidate SFT entries with the smallest value of the sector size.

* * * * *